United States Patent [19]
Kitabatake et al.

[11] Patent Number: 5,416,196
[45] Date of Patent: May 16, 1995

[54] METHOD FOR PREPARING A TRANSPARENT ADJUSTED MILK WHEY PROTEIN AND AN ADJUSTED MILK WHEY PROTEIN PRODUCT

[75] Inventors: Naofumi Kitabatake; Etsushiro Doi, both of Uji; Yohichi Kinekawa, Shiga, all of Japan

[73] Assignee: Daiichi Kasei Co., Ltd., Kyoto, Japan

[21] Appl. No.: 943,121

[22] Filed: Sep. 10, 1992

Related U.S. Application Data

[63] Continuation of Ser. No. 716,696, Jun. 17, 1991, abandoned.

[30] Foreign Application Priority Data

Aug. 31, 1990 [JP] Japan .................................. 2-231131
Aug. 31, 1990 [JP] Japan .................................. 2-231132
Feb. 25, 1991 [JP] Japan .................................. 3-053836

[51] Int. Cl.$^6$ ........................... C07G 7/00; A23J 3/08
[52] U.S. Cl. .................... 530/366; 530/386; 530/832; 530/833; 435/68.1
[58] Field of Search ............... 530/366, 386, 832, 833; 435/68.1

[56] References Cited

U.S. PATENT DOCUMENTS 2,606,181 8/1952 Pratt et al. ........................ 530/833

FOREIGN PATENT DOCUMENTS 311795 4/1989 European Pat. Off.
2063273 6/1981 United Kingdom .

OTHER PUBLICATIONS

Journal of Dairy Science, vol. 68, No. 11 (Nov. 1985) pp. 7847-2852.
Journal of Dairy Science, vol. 60, No. 2 (Aug. 1976) pp. 177-184.
European Search Report.
J. N. deWit, et al.; "Evaluation of Functional Properties Of Whey Protein Concentrates And Whey Protein Isolates, L Isolation, And Characterization", Oct., 1982.
Tamotsu Kuwata; "Separation and Utilization of Whey Components", Japanese Journal of Dairy and Food Science, vol. 29, No. 1, pp. A1–A9.
Tamotsu Kuwata, et al.; "Effects of Defatting and Desalting on Heat Stability of Whey Protein Concentrate," Nippon Shokuhin Koyto Gakkaishi, vol. 32, No. 7, pp. 493–499.
V. H. Holsinger; "Fortifying Soft Drinks With Cheese Whey Protein," Food Technology, Feb. 1973, pp. 59 to 65.
Tamotsu Kuwata, et al.; "Effects of Desalting and Defatting on the Gelling and Foaming," Nippon Shokuhn Kogyo Gakkaishi, vol. 32, No. 9, pp. 639–645.
Ronald H. Schmidt; "Effects of Processing on Whey Protein Functionality," The Journal of Dairy Science, vol. 67, No. 11, 1984, pp. 2723–2733.
H. W. Modler and D. B. Emmons, "Properties of Whey Protein Concentrate Prepared by Heating Under Acidic Conditions", Journal of Dairy Science, vol. 60, pp. 177–183.

*Primary Examiner*—Howard E. Schain
*Assistant Examiner*—P. Lynn Touzeau
*Attorney, Agent, or Firm*—Morgan & Finnegan

[57] ABSTRACT

A transparent adjusted milk whey protein is prepared by a method in which milk whey protein is purified and then the pH of a solution containing the milk whey protein is adjusted to not higher than 4 or not lower than 6. The solution may be heated to a temperature not lower than 55° C. before or after adjusting the pH. Further, an adjusted milk whey product is prepared by a method in which the pH of a solution containing milk whey protein is adjusted to not higher than 4 or not lower than 6 and the solution is heated at a temperature not lower than 55° C. and cooled to a temperature not higher than 10° C., or a method in which the pH of a solution containing purified milk whey protein is adjusted to not higher than 4 or not lower than 6 under such a condition as salt content of the solution is 0 or not higher than 50 mM, and the solution is heated at a temperature not lower than 55° C. and cooled to a temperature not higher than 10° C.

2 Claims, No Drawings

METHOD FOR PREPARING A TRANSPARENT ADJUSTED MILK WHEY PROTEIN AND AN ADJUSTED MILK WHEY PROTEIN PRODUCT

This is a continuation of application Ser. No. 07/716,696, filed on Jun. 17, 1991, now abandoned.

BACKGROUND OF THE INVENTION

The present invention relates to a method for preparing an adjusted milk whey protein maintaining a state of transparent solution or gel, and to a method for preparing an adjusted milk whey protein product which can stably maintain water retention, viscosity, emulsifiability and foaming property good against heating and cooling in a low protein concentration even under salt-containing condition.

Milk whey is the name of a fraction prepared by removing fat and casein from milk and its main protein components are $\beta$-lactoglobulin, $\alpha$-lactalbumin and whey albumin. Such milk whey and milk whey protein are available as the secondary products of dairy product processing in large amount and economically and excellent in taste. Accordingly, they have been recently widely accepted in the foodstuff market as milk whey drinks and milk whey powders.

Furthermore, since milk whey protein has functions of gel formation, foaming, emulsification and the like, it can be used as the raw material for foodstuff processing. However, its application is limited to the gelling agent for foodstuff and the nutrition aid and now it is substantially not used in the industries other than foodstuff industry. The reason is the milk whey protein products manufactured hitherto had unsatisfactory gelling property, viscosity, emulsifiability and foaming property. Especially, it is difficult to prepare its transparent solution and gel.

Polysaccharides or gums such as agar, alginic acid, pectin and carrageenan, animal proteins such as gelatin and vegetable proteins such as glycinin and gluten and various synthetic polymers have been mainly used as the thickening and gelling agents in the commercial products such as foodstuffs, pharmaceuticals and cosmetics. However, they are not economical and insufficient in function and nutrition, and further cannot keep sufficient viscosity and gelling property at an elevated temperature of not lower than 100° C. and under a refrigerated condition of not higher than 0° C. to be lowered in viscosity and to cause water separation and to lose gelling property. Hence, they can exert their effect only in the ambient temperature region. In the presence of a salt, they tend to form an opaque gel or sol and cannot be used for an application requiring transparency.

Further, transparent gel bases include alkali-treated egg white, protease-treated food proteins. However, alkali treatment causes lowering of nutritive value of protein. Enzyme treatment requires expensive enzyme in a large amount and accordingly is not economical. Thus, they have several problems.

In these methods, in all cases, when heated in the presence of a salt, turbid gel or turbid solution is formed and the turbid solution is low in viscosity and its use as a thickener is limited and is also low in emulsifying power and foaming power. Turbid gel is also low in water retention and elasticity to cause several problems.

An object of the present invention is to provide a product which can maintain transparency stably with no lowering of nutritive value by heating from milk whey protein excellent in economics and functions as mentioned above.

An another object of the present invention is to provide a method for the preparation of a new adjusted milk whey protein which forms a viscous transparent or turbid solution or a transparent gel under a salt-containing condition or under low protein concentration.

Further, an another object of the present invention is to provide a simple and economical method for a milk whey protein product which can stably maintain the functions including viscosity, gel property, emulsifiability and foaming property even at an elevated temperature not lower than 100° C. and under a refrigerated condition of not higher than 0° C. and is rich in functionality.

SUMMARY OF THE INVENTION

According to the present invention, a transparent adjusted milk whey protein is prepared by a method in which milk whey protein is purified and then the pH of a solution containing the milk whey protein is adjusted to not higher than 4 or not lower than 6, or a method in which milk whey protein is purified and then a solution containing the milk whey protein is heated to a temperature not lower than 55° C. at a pH of not higher than 4 or not lower than 6 in such a condition as salt content of the solution is 0 or not higher than 50 mM.

In the former method, the solution after adjusting the pH may be heated at a temperature not lower than 55° C.

In the later method, at least one salt may be added to the resultant transparent solution. In this case, the solution is adjusted to a pH of not higher than 4 or not lower than 6 again and then heated.

Further, according to the invention, an adjusted milk whey product is prepared by a method in which the pH of a solution containing milk whey protein is adjusted to not higher than 4 or not lower than 6 and the solution is heated at a temperature not lower than 55° C. and cooled to a temperature not higher than 10° C., or a method in which the pH of a solution containing purified milk whey protein is adjusted to not higher than 4 or not lower than 6 under substantially salt-free condition or low salt concentration, and the solution is heated at a temperature not lower than 55° C. and cooled to a temperature not higher than 10° C.

In the method, a milk whey protein product which is transparent viscous gel or sol fore may be prepared even in the presence of a salt by using a purified milk whey protein in substantially salt-free condition.

DETAILED DESCRIPTION OF THE INVENTION

Milk whey may be prepared, for example, in large amount as a by-product of cheese manufacturing process. In the invention, low molecular weight compounds such as salts and saccharides contained in milk whey are substantially removed and then the pH of solution is adjusted to a value apart from the isoelectric point of milk whey proteins (pH of ca. 5), that is a pH of not higher than 4 or not lower than 6, preferably not higher than 3.5 or not lower than 6.5, or it is heated after the adjustment of pH to prepare a transparent liquid or gel product.

The term "transparent" in the invention includes translucent and means in general that the absorbance measured with Shimadzu's Spectrophotometer UV1-

60A is not higher than 1.5 (by using a wavelength of 600 nm and a glass cell having an optical path length of 1 cm).

Also, the milk whey protein used in the invention may be either milk whey and milk whey protein fraction prepared from it or its main proteins (β-lactoglobulin, α-lactalbumin and whey albumin). Further, sweet whey by-produced in cheese manufacture, acid whey by-produced in acid casein manufacture or rennet whey by-produced in rennet casein manufacture may be used as the milk whey protein.

As the method for the purification of milk whey protein in the invention, any of the methods may be used including dialysis against water or a buffer of low concentration, electrodialysis, chromatography (ion exchange, gel filtration chromatography, hydrophobic chromatography or the like), microfiltration, electrophoresis, adsorptive separation and precipitation separation and the like may be used. They may be used in combination of at least two.

The solution to be heated in the invention may contain a salt for flavoring. In this case, however, the salt shall be added after the adjustment of pH. When a salt is added, it becomes more easily turbid by heating and hence the pH of the solution is preferably adjusted to especially a value not higher than 3.5 or not lower than 6.5.

When it is heated, the content of milk whey protein in the solution is not especially restricted. In the region of low protein concentration not higher than 5 weight %, it becomes to be a transparent solution even after heated and the solution is a viscous liquid. When the concentration is increased, it becomes viscous liquid difficult to be handled. Usually, it is preferred to adjust the concentration to 5 to 20 weight % for easy handling. A protein concentration of not lower than 10 weight % gives a very rigid and highly elastic transparent gel. In general, the salt concentration which can be contained in such a solution is preferably not higher than 200 millimoles (mM), especially not higher than 150 mM from the viewpoint of flavoring of the product.

Also, the heating temperature in the invention is not especially restricted but it is preferably in general not lower than 55° C. and 75° to 95° C. allows easily handling. However, it may be heated to a temperature not lower than 100° C. For example, a heating at a temperature of ca. 120° C. can give a more rigid gel of higher elasticity than the gel prepared by heating at a temperature not higher than 100° C.

On the other hand, the raw material used for preparing an adjusted milk whey protein product, according to the invention, may be that prepared by separating or concentrating the protein contained in milk whey with an ultrafiltration, reverse osmotic membrane method, chromatography or the like. However, it is preferred to make the purified liquid salt-free (salt-free or low ion concentration) by dialysis and the like, and then it is heated and cooled and stored. The liquid to be heated is adjusted to a proper protein concentration according to the aimed viscosity, gel strength and the like. This concentration is not especially limited but in general it is preferred to be adjusted to 2 to 20 weight %, particularly to 4 to 10 weight %. For example, it is preferred to be 1 to 6 weight % for giving a solution or a viscous sol, while 6 to 10 weight % for giving a gel. In the case a hard gel is required, it is preferred to be adjusted to not lower than 10 weight %.

The pH of the liquid is adjusted to not higher than 4 or not lower than 6 prior to heating. The purpose is to prevent coagulation and to prepare stably a viscous liquid or a dense gel by avoiding the isoelectric point of the milk whey protein.

Then, the liquid thus adjusted to the desired pH is heated to a temperature not lower than 55° C., the denaturation temperature of milk whey protein. It is usually preferred to be heated to 70° to 130° C. The higher the heating temperature, the sol obtained is more viscous or the gel is harder. The temperature for cold storage after heating may be not higher than 10° C. and preferably 5° to −197° C. and more particularly it is preferred to store at 5° to −20° C. for several minutes to several days. The cooling method is not especially restricted but it is preferred to cool in a condition with no change in humidity in a closed container. Heating, cooling and thawing can be carried out either rapidly or slowly.

According to the invention, there is stably prepared a transparent viscous gel or sol which causes no water separation, nor lowering of viscosity and gel strength due to freezing and thawing by the above-mentioned heating and cooling treatment. Further, in the invention a stable product can be prepared even at a very low protein concentration as described in Examples shown below, and therefore it can be used in wide applications economically. Though a milk whey protein product may be prepared with no heating and cooling treatment as described above, it is required to increase remarkably the protein concentration to give the same viscosity and gel strength as in the case of the invention and thus it is not economic.

In the invention, a more stable product may be prepared by making it substantially salt-free of as low an ion strength as not higher than 25 mM prior to heating.

By thus method of the invention, a new milk whey protein product which shows special resistance to heating and freezing and is transparent and high in nutritive value can be prepared.

PREFERRED EMBODIMENTS OF THE INVENTION

The following examples serve to illustrate the invention in more detail although the invention is not limited to the examples.

EXAMPLE 1

Sweet whey by-produced in cheese manufacture was concentrated to ca. 50 times by ultrafiltration and at the same time most of saccharides, minerals and salts were removed by washing. Protein concentration in this concentrated milk whey was adjusted to ca. 5 weight % and at the same time its pH was adjusted to 7 by using sodium hydroxide or hydrochloric acid. Then, it was heated at 80° C. for 1 hour and cooled to room temperature with flowing water and then stored at −80° C. for 30 min. and then thawed to room temperature by using warm water at 50° C.

Resultantly, a highly transparent and highly viscous sol was obtained. The sol had a far higher viscosity than a milk whey protein sol of the same concentration prepared only by heating and, even though it was frozen again at −80° C. and thawed at room temperature, the transparency, viscosity and water retention did not substantially changed.

EXAMPLE 2

The sol of concentrated milk whey protein liquid prepared by Example 1 after heated at 80° C. for 1 hour was stored at −20° C. for 1 week and then naturally thawed to room temperature to give a transparent gel of high water retention. This gel was remarkably high in viscosity and water retention in comparison with a milk whey protein sol of the same concentration prepared by only heating and, even though it was frozen −80° C. and thawed at room temperature, each of gel strength and water retention was never lowered.

Contrary to it, a gel of the same strength as the gel prepared by this Example was prepared by using agar. In this gel, shrinkage and water separation occurred by freezing and thawing as mentioned above.

EXAMPLE 3

A concentrated milk whey protein liquid containing 7% by weight of protein and having a pH of 7 was prepared by the same method as in Example 1. This liquid was heated at 80° C. for 1 hour and then cooled to room temperature and stored at −80° C. for 30 min. and thawed to room temperature by using warm water at 50° C. to give a hard transparent gel of high water retention. This gel was remarkably high in viscosity and water retention in comparison with a milk whey protein sol of the same concentration prepared by only heating and, even though it was frozen at −80° C. and thawed at room temperature, the gel strength and the water retention were not lowered.

Contrary to it, a milk whey protein gel prepared only by heating showed water separation and shrinkage. Gels of the same strength as the gel prepared by this Example were prepared by using respectively egg white, gelatin and agar. The gels from agar and egg white showed shrinkage and water separation by freezing and thawing as mentioned above and the gel from gelatin showed no change in property but was changed to a sol by slightly rising temperature.

EXAMPLE 4

A concentrated milk whey protein liquid containing 7% by weight of protein and having a pH of 7 was prepared by the same method as in Example 1. This liquid was heated at 80° C. for 1 hour, then cooled to room temperature and stored at −20° C. for 24 hours and thawed to room temperature by using warm water at 50° C. to give a hard transparent gel of high water retention. This gel was remarkably high in viscosity and water retention in comparison with a milk whey protein sol of the same concentration prepared by only heating and showed no lowering of gel strength and water retention even though it was frozen at −80° C. and thawed at room temperature.

Contrary to it, a milk whey protein gel prepared only by heating showed water separation and shrinkage. Gels of the same strength as the gel prepared by this Example were prepared by using respectively egg white, gelatin and agar. The gels from agar and egg white showed shrinkage, toughening of texture and water separation by freezing and thawing as mentioned above, and the gel from gelatin showed no change in property but was changed to a sol by slightly rising temperature.

EXAMPLE 5

Sweet whey by-produced in acid casein manufacture was concentrated to ca. 50 times by ultrafiltration and at the same time most of saccharides, minerals and salts were removed by washing. Protein concentration in this concentrated milk whey was adjusted to ca. 9 weight % and simultaneously its pH was adjusted to 7 by using sodium hydroxide or hydrochloric acid. Then, the liquid was heated at 80° C. for 1 hour and cooled to room temperature with flowing water and then stored at −80° C. for 30 min. and then thawed to room temperature by using warm water at 50° C.

Resultantly, a highly transparent and hard polyacrylamide-gel like gel which is superior in water retention was obtained. This gel was heated in a retort (at 121° C. for 4 min.) or frozen at −80° C. and thawed but did not show any change in the state.

EXAMPLE 6

The protein concentration of a concentrated milk whey prepared by a same procedure as in Example 5 was adjusted to 4 weight % and the pH was adjusted to 7. Then the resultant liquid was cooled to +4° C. and stored at the temperature for 1 week to give a transparent viscous liquid, which was very superior in emulsifying power in comparison with the milk whey protein liquid before the above-mentioned cooling treatment.

The emulsified product was heated, frozen and thawed and the emulsion stability was tested. The result was highly excellent for the product of the Example.

EXAMPLE 7

The protein concentration of a concentrated milk whey prepared by a same procedure as in Example 5 was adjusted to 4 weight % and the pH was adjusted to 7. Then the liquid was cooled to +4° C. and stored at the temperature for 1 week to give a transparent viscous liquid, which was very superior in foaming property in comparison with the milk whey protein liquid before the above-mentioned cooling treatment.

The foamed product was heated, frozen and thawed and the emulsion stability was tested. The result was highly excellent for the product of the Example.

EXAMPLE 8

A milk whey protein product was prepared in the same manner as in Example 1 except that, after sweet whey by-produced in cheese manufacture was concentrated to ca. 50 times by ultrafiltration and most of saccharides, minerals and salts were removed by washing, the resultant material was dialyzed to lower the ion concentration.

This product was a highly transparent and highly viscous sol similar to that in Example 1. Even though a salt was added to it, it was stably transparent. Further, even though it was frozen again at −80° C. and thawed at room temperature, the properties such as transparency, viscosity and water retention were not substantially changed.

EXAMPLE 9

The sol of concentrated milk whey protein liquid prepared by Example 8 after heated at 80° C. for 1 hour was stored at −20° C. for 1 week and then naturally thawed to room temperature to give a transparent gel of high water retention. This gel was a product high in viscosity and water retention similar to that in Example 2 and showed no lowering of gel strength and water retention even though it was frozen at −80° C. and thawed at room temperature. Further, in the presence of a salt, it was transparent and the characteristics were stably maintained.

EXAMPLE 10

A concentrated milk whey protein liquid containing 7% by weight of protein and having a pH of 7 was prepared by the same method as in Example 8. This liquid was heated at 80° C. for 1 hour and then cooled to room temperature and stored at −80° C. for 30 min. and thawed to room temperature by using warm water at 50° C. to give a hard transparent gel of high water retention.

This gel was very excellent in gel strength and water retention and showed no lowering of gel strength and water retention even though it was frozen at −80° C. and thawed at room temperature. Further, in the presence of a salt, it was transparent and the characteristics were stably maintained.

EXAMPLE 11

A concentrated milk whey protein liquid containing 7% by weight of protein and having a pH of 7 was prepared by the same method as in Example 8. This liquid was heated at 80° C. for 1 hour and then cooled to room temperature and stored at −20° C. for 24 hours and thawed to room temperature by using warm water at 50° C. to give a hard transparent dense gel of high water retention.

This gel was very excellent in gel strength and water retention and showed no lowering of gel strength and water retention even though it was frozen at −80° C. and thawed at room temperature. Further, in the presence of a salt, it was transparent and the characteristics were stably maintained.

EXAMPLE 12

A milk whey protein product was prepared by the same procedure as in Example 5 except that, after sweet whey by-produced in acid casein manufacture was concentrated to ca. 50 times by ultrafiltration, it was dialyzed to make the concentrated milk whey almost salt-free. The product was a hard polyacrylamide-gel like gel of very high transparency and water retention. When heated in a retort (at 121° C. for 4 min.) or frozen at −80° C. and thawed, it was substantially changed in the state. Further, in the presence of a salt, it was transparent and the characteristics were stably maintained.

EXAMPLE 13

The protein concentration of a concentrated milk whey prepared by the same procedure as in Example 12 was adjusted to 4 weight % and the pH was adjusted to 7 and then cooled to +4° C. and stored at the temperature for 1 week to give a transparent viscous liquid. This liquid had very high emulsifying power and showed very excellent emulsion stability against heating, freezing and thawing.

EXAMPLE 14

The protein concentration of a concentrated milk whey prepared by the same procedure as in Example 12 was adjusted to 4 weight % and the pH was adjusted to 7. Then the liquid was cooled to +4° C. and stored at the temperature for 1 week to give a transparent viscous liquid. The resultant liquid had a high foaming power and showed very excellent foam stability against heating, freezing and thawing.

EXAMPLE 15

Fatty components were removed from milk by centrifugation and the pH of the resultant liquid was adjusted to 4.5 and the precipitated casein fraction was removed by centrifugation to prepare a milk whey.

Then, the milk whey was dialyzed against water to prepare a transparent milk whey protein solution. By this treatment, low molecular weight compounds such as salts and saccharides were removed. Though precipitate was formed by the dialysis, the composition of the milk whey protein showed little change even this precipitate was removed by centrifugation.

The pH of the resultant supernatant liquor was adjusted to respectively 3.5 and 6.5 and the protein concentration was adjusted to 7% and then heated to 80° C.

Milk whey and milk whey protein solution become usually turbid when heated under these conditions. However, the milk whey protein of the Example treated by dialysis showed no turbidity after heating to give a transparent liquid.

The viscosity of the solution depended on the protein concentration. A higher protein concentration gave more viscous liquid but the transparency of the liquid was maintained.

EXAMPLE 16

The same procedure was repeated as in Example 15 and the product was exhausively dialyzed against water to prepare a transparent milk whey protein solution.

This milk whey protein solution was divided to three equal parts and the pH of each aliquot was adjusted to each 3.5, 7.0 and 8.5 by addition of 2N sodium hydroxide or hydrochloric acid solution and further the protein concentration and the sodium chloride concentration were adjusted to 7% and 50 mM, respectively, and then the solution was heated at 80° C. for 1 hour.

As the result, all solution was gelled. However, the samples having pH of 3.5 and 7.0 were translucent gels and that having a pH of 8.5 was a transparent gel. Thus, they were not turbid products.

EXAMPLE 17

The same procedure was repeated as in Example 15 and the product was fully dialyzed against water to prepare a transparent milk whey protein solution. The pH of the milk whey protein solution was adjusted to 7.5 and the protein concentration and the sodium chloride concentration were respectively adjusted to 12% and 50 mM and then the solution was heated at 121° C. for 4 minutes.

As the result, a transparent gel prepared here was far harder and more elastic than the transparent gel prepared by Example 16.

EXAMPLE 18

The same procedure was repeated as in Example 15 and the product was fully dialyzed against water to prepare a transparent milk whey protein solution. The pH of the milk whey protein solution was adjusted respectively 5.5 and 7.0 and the protein concentration was adjusted to 3% and then the solution was heated at 80° C. for 1 hour. As the result, a viscous turbid liquid was prepared at a pH of 5.5 and a viscous transparent liquid was prepared at a pH of 7.0. They showed high viscosities.

EXAMPLE 19

The same procedure was repeated as in Example 15 and the product was fully dialyzed against water to prepare a transparent milk whey protein solution. The pH of the milk whey protein solution was adjusted respectively 5.5 and 7.0 and the protein concentration was adjusted to 7% and then the solution was heated at 80° C. for 1 hour. As the result, a turbid gel was prepared at a pH of 5.5 and a transparent gel was prepared at a pH of 7.0. Both gels were soft and pastes were obtained by crushing these gels.

EXAMPLE 20

The same procedure was repeated as in Example 15 and the product was fully dialyzed against water to prepare a transparent milk whey protein solution. The pH of the milk whey protein solution was adjusted respectively 5.5 and 7.0 and the protein concentration was adjusted to 12% and then the solution was heated at 80° C. for 1 hour. As the result, a turbid gel was prepared at a pH of 5.5 and a transparent gel was prepared at a pH of 7.0. Both gels were hard, highly elastic, and excellent in water retention.

EXAMPLE 21

The same procedure was repeated as in Example 15 and the product was fully dialyzed against water to prepare a transparent milk whey protein solution.

This milk whey protein solution was divided to three equal parts and the pH of each aliquot was adjusted to each 3.5, 7.0 and 8.5 by using 2N sodium hydroxide or hydrochloric acid and at the same time the protein concentration and the sodium chloride concentration were respectively adjusted to 7% and 150 mM and then the solution was heated at 80° C. for 1 hour.

As the result, a translucent gel was prepared at a pH of 3.5, while turbid gels were prepared at pH of 7.0 and 8.5.

EXAMPLE 22

Milk whey prepared by the same procedure as in Example 15 was dialyzed against a buffer and centrifuged to prepare a transparent supernatant that is milk whey protein.

Using the supernatant as the starting material, the main component of milk whey protein, $\beta$-lactoglobulin, was prepared by ion exchange chromatography and gel chromatography.

The resultant $\beta$-lactoglobulin was fully dialyzed against distilled water and then the pH was adjusted from 2 to 9 at intervals of 0.5. The protein concentration was adjusted to 6.5%. These solutions were heated at 90° C. for 1 hour. Translucent gels were obtained at pH of not higher than 3.5. Transparent solutions were obtained at pH of 6.5 to 7.5. A transparent gel was obtained at a pH of 8.5.

A same experiment by using commercial $\beta$-lactoglobulin gave a similar result.

EXAMPLE 23

$\beta$-Lactoglobulin prepared by the same procedure as in Example 22 was fully dialyzed against distilled water and then the pH was adjusted from 2 to 9 at intervals of 0.5.

Sodium chloride was added to each products to a final concentration of 50 mM and at the same time the protein concentration was adjusted to 6.5%.

These solutions were heated at 90° C. for 1 hour. Translucent gels were obtained at pH of not higher than 3.5. Turbid gels or turbid liquids were obtained at pH of 3.5 to 6.5, while translucent gels were formed at a pH of not lower than 6.5.

EXAMPLE 24

$\beta$-Lactoglobulin prepared by the same procedure as in Example 22 was fully dialyzed against distilled water and then the pH was adjusted from 2 to 9 at intervals of 0.5.

Sodium chloride was added to each product to a final concentration of 100 mM and at the same time the protein concentration was adjusted to 6.5%.

These solutions were heated at 90° C. for 1 hour. Translucent gels were obtained at pH of not higher than 3.5. Turbid gels or turbid solutions were prepared at pH of 3.5 to 8.5, while translucent gels were formed at a pH of not lower than 9.

EXAMPLE 25

Bovine serum albumin (Sigma Co., Fraction V) was fully dialyzed against distilled water and the pH of the resultant solution was adjusted to from 2 to 9 at intervals of 0.5. The protein concentration was adjusted to 7%.

These solutions were heated at 90° C. for 1 hour. Transparent solutions were obtained at pH of 2 and 2.5, translucent gels at pH of 3 and 3.5 and turbid gels or turbid solutions at pH of 4 to 6.5 and transparent solutions at a pH of not lower than 7 were obtained.

EXAMPLE 26

Bovine serum albumin prepared by the same procedure as in Example 25 was dialyzed against distilled water and then the pH was adjusted to 2 to 9 at intervals of 0.5 and at the same time the protein concentration was adjusted to 7% for all solutions.

Sodium chloride was added to each sample thus prepared to a final concentration of 50 mM and the solutions were heated at 90° C. for 1 hour. Transparent gels were obtained at pH of 2 and 2.5. Turbid gels at pH of 3 and 3.5. Turbid gels or turbid solutions were prepared at pH of 4 to 6.5. Translucent gels were formed at a pH of not lower than 7.

EXAMPLE 27

The pH of a milk whey protein solution prepared by the same procedure as in Example 15 was adjusted to 7 and the protein concentration of it was adjusted to 7% and then sodium chloride was added to it in such amounts as shown in the following table and the solutions were heated at 80° C. for 1 hour. Then, the transparencies of the products were measured with Shimadzu's Spectrophotometer UV 160A as the absorbance at 600 nm. The results are shown as follows.

|     | NaCl amount(mM) | Absorbance | State of the product |
| --- | --- | --- | --- |
| (1) | 0   | 0.037 | Transparent |
| (2) | 30  | 0.449 | Transparent |
| (3) | 40  | 0.592 | Transparent |
| (4) | 50  | 1.336 | Translucent |
| (5) | 100 | Not lower than 2.3 | Turbid |
| (6) | 200 | Not lower than 2.3 | Turbid |

EXAMPLE 28

Bovine serum albumin (Sigma Co., Fraction V) was fully dialyzed against distilled water and the pH of the resultant solution was adjusted to 7 and at the same time the protein concentration was adjusted to 6.5 and then sodium chloride was added to it in such amounts as shown in the following table and the solutions were heated at 80° C. for 1 hour.

Then, the transparencies of the products were measured with Shimadzu's Spectrophotometer UV 160A as the absorbance at 600 nm. The results are shown as follows.

|     | NaCl amount(mM) | Absorbance | State of the product |
| --- | --- | --- | --- |
| (1) | 0 | 0.329 | Transparent |
| (2) | 50 | 0.592 | Transparent |
| (3) | 100 | Not lower than 2.3 | Turbid |

EXAMPLE 29

The same procedure was carried out as in Example 28 using $\beta$-lactoglobulin (Sigma Co.). As the result, transparent products were prepared by no addition and addition of sodium chloride (50 mM), while transparent product can not be obtained at 100 mM NaCl.

EXAMPLE 30

Milk whey protein prepared by the same procedure as in Example 15 was dialyzed against water and the pH of the resultant transparent solution containing 7% protein was adjusted respectively to 3 and 9. Transparent viscous sols were obtained.

EXAMPLE 31

Fatty components were removed from milk by centrifugation and the pH of the resultant solution was adjusted to 4.5 and precipitated casein fraction was removed further by centrifugation to prepare milk whey.

This milk whey was dialyzed against water to prepare milk whey protein. Low molecular weight compounds such as salts and saccharides were removed by this treatment. Precipitate formed by the dialysis was removed by centrifugation.

Little change in the milk whey protein composition was observed by such a treatment.

The protein concentration and the pH of the resultant supernatant were adjusted to 7% and 7, respectively, and it was heated at 80° C. for 1 hour.

The pH of the resultant transparent solution, that is the adjusted milk whey protein, was adjusted to 2 to 9 at intervals of 0.5 and sodium chloride was added to a final concentration of 50 mM.

These solutions were again heated at 90° C. for 1 hour. The products adjusted to a pH of not higher than 3.5 was kept as a transparent solution. The products of pH of 4 to 6.5 were turbid gels or turbid liquids and those of a pH of not lower than 7 were transparent gels.

EXAMPLE 32

The protein concentration and the pH of the milk whey prepared in the same manner as in Example 31 were respectively adjusted to 7% and 7 and the product was heated at 80° C. for 1 hour. A transparent liquid adjusted milk whey protein was prepared by this procedure.

The pH of this solution was adjusted to 2 to 9 at intervals of 0.5 and sodium chloride was added to a final concentration of 100 mM. The solution thus having enhanced viscosity was further again heated at 90° C. for 1 hour. The products of pH of not higher than 3.5 were translucent gels, those of pH of 4 to 6.5 were turbid gels or turbid liquids and those of pH of higher than that were transparent or translucent gels.

EXAMPLE 33

Milk whey prepared in the same manner as in Example 31 was dialyzed against distilled water and centrifuged to give a supernatant. The protein concentration and the pH of this transparent solution were adjusted respectively to 7% and 7 and the solution was heated at 80° C. for 1 hour to prepare an adjusted milk whey protein.

The pH of this adjusted milk whey protein was adjusted to 6.5, 7.5 and 8.5 and sodium chloride was added to a final concentration of 100 mM and the mixture was heated at 121° C. for 4 minutes. As the result, transparent gels were formed in all cases and the transparent gel was harder and more elastic than the transparent gel prepared by heating at 90° C. in Example 16.

EXAMPLE 34

Milk whey prepared in the same manner as in Example 31 was dialyzed against a buffer and centrifuged to give a supernatant. The main component of milk whey protein, $\beta$-lactoglobulin, was prepared from this supernatant by ion exchange chromatography and gel chromatography.

The pH of the resultant $\beta$-lactoglobulin solution was adjusted to 7 and the solution was heated at 80° C. for 1 hour and hydrochloric acid or sodium hydroxide was added to the resultant transparent solution to adjust the pH to 2 to 9 at intervals of 0.5 and sodium chloride was added to a final concentration of 50 mM.

This solution was again heated at 90° C. for 1 hour. Products of pH of not higher than 3.5 were translucent gels, those of pH of 4 to 6 were turbid gels and those of pH of not lower than 6.5 were transparent gels.

The same experiment by using commercial $\beta$-lactoglobulin gave the same result.

EXAMPLE 35

Milk whey prepared in the same manner as in Example 31 was treated in the same manner as in Example 34 to prepare $\beta$-lactoglobulin. The pH of this transparent solution of $\beta$-lactoglobulin was adjusted to 7 and the solution was heated at 80° C. for 1 hour and hydrochloric acid or sodium hydroxide was added to the resultant transparent solution to adjust the pH to 2 to 9 at intervals of 0.5 and further the protein concentration was adjusted to 6.5% and then sodium chloride was added to each solutions to a final concentration of 100 mM.

These solutions were again heated at 90° C. for 1 hour. Products of pH of not higher than 3.5 were translucent gels. Those of pH of 4 to 6 were turbid gels and those of pH of not lower than 6.5 were translucent gels.

The same experiment by using commercial $\beta$-lactoglobulin gave the same result.

EXAMPLE 36

A major protein originated from milk whey, bovine serum albumin (Sigma Co., Fraction V), was fully dialyzed against distilled water and then the pH of the resultant solution was adjusted to 2 to 9 at intervals of 0.5 and at the same time the protein concentration was adjusted to 7%. These solutions were heated at 80° C. for 1 hour and hydrochloric acid or sodium hydroxide was added to the resultant transparent solutions to adjust the pH to 2 to 9 at intervals of 0.5 and sodium chloride was added to a final concentration of 50 mM.

These solutions were again heated at 90° C. for 1 hour.

Transparent solutions were obtained at pH of not higher than 3.5, translucent gels at pH of 3 and 3.5 and turbid gels at pH of 4 to 6 and transparent gels were formed at a pH of not lower than 6.5.

EXAMPLE 37

A major protein originated from milk whey, bovine serum albumin (Sigma Co., Fraction V), was fully dialyzed against distilled water and then the pH of the resultant solution was adjusted to 2 to 9 at intervals of 0.5 and at the same time the protein concentration was adjusted to 7%. These solutions were heated at 80° C. for 1 hour and hydrochloric acid or sodium hydroxide was added to the resultant transparent solutions to adjust the pH to 2 to 9 at intervals of 0.5 and sodium chloride was added to a final concentration of 100 mM.

These solutions were again heated at 90° C. for 1 hour. Products of pH of not higher than 3.5 were translucent gels, those of pH of 4 to 6 were turbid gels and those of pH of not lower than 6.5 were transparent gels.

EXAMPLE 38

The pH of the milk whey protein prepared by dialysis in the same manner as in Example 31 was adjusted to 7 and the solution was heated at 80° C. for 1 hour and then the pH of the resultant transparent solution was adjusted to 7 and sodium chloride was added in various amounts to final concentrations of 0 to 200 mM and these solutions were again heated at 90° C. for 1 hour.

The transparencies of the products thus prepared were measured with Shimadzu's Spectrophotometer UV-160A. The results are shown in the following table.

|   | NaCl amount(mM) | Absorbance | State of the product |
|---|---|---|---|
| (1) | 0 | 0.022 | Transparent |
| (2) | 30 | 0.241 | Transparent |
| (3) | 40 | 0.271 | Transparent |
| (4) | 50 | 0.325 | Translucent |
| (5) | 100 | 1.308 | Translucent |
| (6) | 200 | Not lower than 2.3 | Opaque |

EXAMPLE 39

Bovine serum albumin (Sigma, Fraction V) was fully dialyzed against distilled water and then the pH of the solution was adjusted to 7 and at the same time the protein concentration of said solution was adjusted to 6.5%.

This solution was heated at 80° C. for 1 hour and then the pH of the resultant solution was adjusted to 7 and sodium chloride was added in various amounts to a final concentration of 0 to 200 mM and these solutions were heated again at 90° C. for 1 hour.

The transparencies of the products thus prepared were measured with Shimadzu's Spectrophotometer UV-160A. The results are shown in the following table.

|   | NaCl amount(mM) | Absorbance | State of the product |
|---|---|---|---|
| (1) | 0 | 0.293 | Transparent |
| (2) | 50 | 0.380 | Transparent |
| (3) | 100 | 0.532 | Transparent |
| (4) | 150 | 0.580 | Transparent |
| (5) | 200 | 0.591 | Transparent |

EXAMPLE 40

The same procedure was carried out as in Example 38 by using β-lactoglobulin. As the result, in the case sodium chloride was added in the range of 0 to 200 mM as in Example 38, transparent heated products were obtained in all cases.

As described above, the present invention can convert the milk whey protein into a transparent product safely, rapidly, economically and in large amount, and can provide it as an adjusted milk whey protein of practical importance. Further, it can stably convert the milk whey protein into a heated transparent product even under a condition a salt is added.

Consequently, it makes the milk whey protein of high nutritive value applicable widely to various applications such as foodstuffs, cosmetics and pharmaceuticals in good appearance. The product according to the present invention can keep transparency in neutral and weakly acidic regions stably and thus is very easy to be handled.

Further, the present invention can provide a milk whey product which stably maintain viscosity, gelling property, emulsifiability and foaming property, etc. even at as high a temperature as 100° C. or more and at as low a temperature as 0° C. or less by using milk whey protein economically available in large amount as the raw material. As the result, a surplus material can be widely applied in foodstuffs, cosmetics, pharmaceuticals and industrial products as a milk whey protein processed good high in nutrition value and rich in functionality.

What is claimed is:

1. A method for the preparation of a transparent adjusted milk whey protein, comprising the steps of:
    a) purifying the milk whey protein whereby the salt concentration of the purified protein is less than 50 millimoles;
    b) adjusting the pH of the purified milk whey protein to a pH either below 4 or above 6;
    c) heating the pH adjusted purified milk whey protein to a temperature above 55° C.;
    d) adding at least one salt compound to the heated, pH adjusted purified milk whey protein to form a first solution;
    e) adjusting the pH of the first solution to a pH either below 4 or above 6; and
    f) heating the pH adjusted first solution.

2. A method for the preparation of an adjusted milk whey product, comprising the steps of:
    a) purifying the milk whey protein whereby the salt concentration is less than 50 millimoles;
    b) adjusting the pH of the purified milk whey protein to a pH of either below 4 or above 6;
    c) heating the pH adjusted purified milk whey protein to a temperature above 55° C.; and
    d) cooling the heated pH adjusted purified milk whey protein to a temperature below 10° C.

* * * * *